United States Patent Office 3,132,685
Patented May 12, 1964

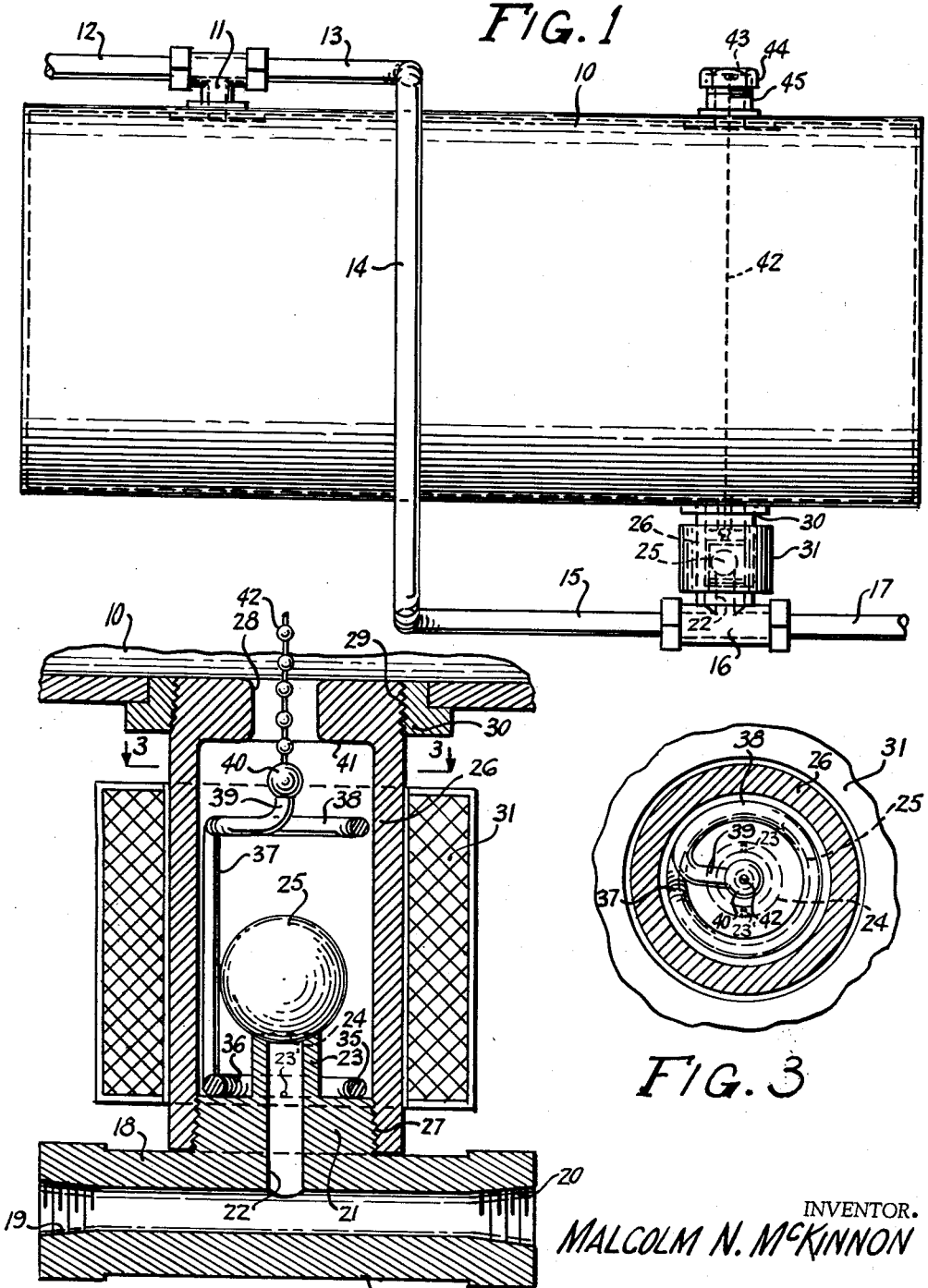

3,132,685
AUXILIARY FUEL SYSTEM FOR VEHICLES
Malcom N. McKinnon, 1222 S. Main St.,
Salt Lake City, Utah
Filed Apr. 2, 1962, Ser. No. 184,008
3 Claims. (Cl. 158—46.5)

This invention relates to an auxiliary fuel system for vehicles, and constitutes an improvement over my prior Patent No. 2,960,156.

A primary object of this invention is the provision of means in an auxiliary fuel system for vehicles including an auxiliary tank and a solenoid actuated ball valve for releasing the contents of said tank upon failure of the normal fuel supply, of means whereby in the event of failure of the solenoid actuated valve, the same may be manually lifted.

A further object of the invention is the provision of means of this character whereby the solenoid valve leading from the auxiliary fuel tank to the fuel feed line of the carburetor may be manually opened for inspection or cleaning, without the necessity of disassembly of the same.

A further object of the invention is the provision of a device of this character which includes means whereby the ball valve will automatically reseat itself when the manual lift means are released.

Still other objects reside in the combinations of elements, arrangements of parts, and features of construction, all as will be more fully pointed out hereinafter and disclosed in the accompanying drawings wherein:

FIGURE 1 is a side elevational view of an auxiliary fuel tank for a motor vehicle having the apparatus of the instant invention associated therewith.

FIGURE 2 is an enlarged longitudinal sectional view of the solenoid actuated valve of the instant invention and its associated mechanism taken substantially along the center line thereof; and FIGURE 3 is a sectional view taken aubstantially along the line 3—3 of FIGURE 2 as viewed in the direction indicated by the arrows.

Having reference now to the drawings in detail, there is shown at 10 an auxiliary fuel tank which is adapted to be installed in a motor vehicle for the purpose of retaining a small supply of fuel to enable the vehicle to proceed to a filling station in the event of accidental exhaustion of fuel in the main tank, failure of the fuel pump, clogging of the feed line, or similar contingency.

The tank 10 has a T-fitting 11 in the top thereof, the stem extending through a suitable opening in the top of the tank and the legs of the T being connected, respectively, to a first pipe 12 which extends from the main fuel tank of the vehicle, and a second pipe 13 which extends downwardly as at 14 to the bottom of tank 10, and is provided with a transverse portion 15 which fits into one end of a second T-fitting 16. From the other end of the head of T-fitting 16 a line 17 extends to the carburetor of the vehicle. T-fitting 16 comprises, as best shown in FIG. 2, a cross head 18 provided with opposite threaded openings 19 and 20 for connection to the fuel lines 15 and 17 as previously described, and a threaded boss 21 forming the stem of the T and including a reduced passageway 22. Passageway 22 extends through the boss 21 and terminates in an upstanding projection 23, the top of which is recessed as at 24 to form a seat for a ball valve 25, which is normally held in position by gravity. A tube 26 of brass or other suitable non-magnetic material is threaded at its lower extremity as at 27 and engages the threads of member 21.

The upper end of tube 26 is provided with a reduced aperture 28 which communicates with the interior of the fuel tank 10, the outer portion of the upper end of brass member 26 being threaded as indicated at 29 and seating in a flanged collar 30 permanently fixed in an opening in the bottom of tank 10. A solenoid coil 31 of conventional design surrounds the brass tube 26, and upon energization, in any conventional manner, serves to lift the steel ball 25 out of engagement with its associated seat 24, to permit passage of fuel from the tank 10 through the openings 28 and 22 into the interior of T 16 and thence through line 17 to the carburetor of the vehicle.

The improvement of the instant invention comprises a wire ring 35 which normally seats on the top 36 of boss 21 interiorly of the brass tube 26, and surrounds the projection 23 forming the support for the valve seat 24. Ring 35 is of lesser diameter than ball 25, and is connected by an upright 37 to an upper ring 38, the end of which terminates in an upstanding portion 39 having a socket 40 on the end thereof. Ring 38 is spaced slightly below the top 41 of the interior of tube 26, so that the top 41 forms a shoulder surrounding passage 28 serving as a stop for raising the ring 38 and consequently the ring 35. The ring 38 is approximately the same diameter as ring 35, so that 38 acts as a steadying ring for the cage.

A ball chain 42 is connected to socket 40 and extends upwardly through opening or passageway 28 and is connected as at 43 to a cap or plug 44 which closes an apertured fitting 45 on the top of tank 10 directly above the outlet passage 28.

The operation of the device is as previously described, in that upon fuel failure through line 12, which also serves normally to keep tank 10 full, solenoid coil 31 is energized to lift ball valve 25 from its associated seat 24, and as long as the solenoid is energized, fuel will flow from tank 10 into the passage in the head 16 and thence through line 17 to the carburetor until exhausted.

However, should the valve fail for any reason, unscrewing the threaded cap 44 and raising the same will, through ball chain 42, lift ring 38 and hence cause ring 35 to rise a sufficient distance to unseat the ball 25, permitting passage of fuel through the opening 22. Upon releasing chain 42 or replacing cap 44, the diameter of the ball 25 is such that it automatically reseats itself on seat 24, reclosing the passage.

Obviously, opening the valve 25 may be desirable at other times, for inspection, cleaning, or similar purposes, and may be effected manually in the manner previously described.

Under certain conditions, moisture might collect at the bottom of tube 26, which in freezing weather might cause lift coil 35 to freeze thereto. To obviate this, a minute drainage opening 23' is bored through the bottom of the wall of valve seat member 23 which will allow any moisture to feed into the flow of gasoline and be disposed of without collecting under and around coil 35.

Opening 23' also allows enough gasoline to flow through line 17 to the carburetor to keep the engine from dying altogether but not enough to develop sufficient power to move the vehicle. This small flow prevents excessive use of the engine starting battery when a new supply of fuel is furnished from the tank 10 to the carburetor, after ball valve 25 is lifted in the manner previously described.

From the foregoing it will now be seen that there is herein provided an improved manual control for a solenoid actuated ball valve in an auxiliary fuel system for vehicles which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:
1. An auxiliary fuel system for vehicles comprising an auxiliary fuel tank adapted to be interposed between the main fuel tank and the carburetor of a vehicle, and in parallel with a main fuel supply line between said flow points,
   (1) the main supply line extending first above, then downwardly and finally to a position below the auxiliary tank,
   (2) a T-fitting in said main fuel supply line communicating downwardly with the top of said auxiliary tank and normally maintaining the same full of fuel,
   (3) a second T-fitting in said main fuel supply line communicating upwardly with the bottom of said auxiliary tank,
   (4) the stem of said second T-fitting including a tube of suitable non-magnetic material fastened therearound,
   (5) a central upright hollow cylindrical projection terminating in a spherical concave valve seat,
   (6) a connection between the tube and the interior of the tank,
   (7) a ball valve normally seating on said valve seat,
   (8) a solenoid coil surrounding said tube adapted upon energization to lift the ball valve from the seat,
   (9) auxiliary manual means for lifting the ball valve from its seat independently of the solenoid,
   (10) said means including a flexible control element passing from the top of the tank to within the tube, a ball cage with a ball lifting horizontal lower wire loop below the ball valve and surrounding the upright projection when in an inoperative position, a steadying wire loop above the ball valve integrally connected to the first recited loop, the latter loop terminating in an upstanding central socket,
   (11) and a connection between the flexible control means and the central socket.
2. The structure of claim 1 wherein,
   (1) the tank has an opening in the top thereof vertically aligned with the tube,
   (2) a screw cap for the opening provided with connective means for the flexible control element,
   (3) the control element being of such length that the unscrewing of the cap will lift the ball cage upwardly so as to unseat the ball valve.
3. The structure of claim 1 wherein
   (1) said upright cylindrical projection is provided with a minute opening through the wall thereof at its base,
   (2) to dispose of any moisture accumulating around the bottom of such projection,
   (3) and permit a continuous slight flow of gasoline from said auxiliary fuel tank.

References Cited in the file of this patent
UNITED STATES PATENTS

| | | |
|---|---|---|
| 69,745 | Andrews | Oct. 15, 1867 |
| 1,173,728 | Milne | Feb. 29, 1916 |
| 1,440,520 | Young | Jan. 2, 1923 |
| 1,470,775 | Stephens | Oct. 16, 1923 |
| 2,623,545 | Traynor | Dec. 30, 1952 |
| 2,729,283 | Mathey | Jan. 3, 1956 |
| 2,960,156 | McKinnon | Nov. 15, 1960 |

FOREIGN PATENTS

| | | |
|---|---|---|
| 217,525 | Germany | Jan. 4, 1910 |
| 262,590 | Great Britain | Dec. 16, 1926 |